(12) United States Patent
Oyama et al.

(10) Patent No.: US 8,424,624 B2
(45) Date of Patent: Apr. 23, 2013

(54) VEHICLE AND CONTROL METHOD OF VEHICLE

(75) Inventors: Shunsuke Oyama, Aichi-ken (JP); Yuichi Tanaka, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 502 days.

(21) Appl. No.: 12/527,972

(22) PCT Filed: Feb. 19, 2008

(86) PCT No.: PCT/JP2008/052771
§ 371 (c)(1),
(2), (4) Date: Aug. 20, 2009

(87) PCT Pub. No.: WO2008/105274
PCT Pub. Date: Sep. 4, 2008

(65) Prior Publication Data
US 2010/0065357 A1  Mar. 18, 2010

(30) Foreign Application Priority Data

Feb. 21, 2007 (JP) ................................. 2007-040656

(51) Int. Cl.
*B60W 10/00* (2006.01)

(52) U.S. Cl.
USPC ................. 180/65.265; 180/65.28; 180/65.29

(58) Field of Classification Search ............. 180/65.265, 180/65.28, 65.285, 65.29
See application file for complete search history.

(56) References Cited

U.S. PATENT DOCUMENTS

| 5,713,814 A | 2/1998 | Hara et al. |
| 6,118,237 A * | 9/2000 | Kikuchi et al. ................ 318/139 |
| 2003/0231005 A1 | 12/2003 | Kohama et al. |
| 2006/0021808 A1 * | 2/2006 | McGee et al. ................ 180/65.2 |

FOREIGN PATENT DOCUMENTS

| JP | 2000-092614 A | 3/2000 |
| JP | 2001-268715 A | 9/2001 |
| JP | 2003-339103 A | 11/2003 |
| JP | 2005-341633 A | 12/2005 |
| JP | 2005-348524 A | 12/2005 |
| JP | 2006-174596 A | 6/2006 |
| JP | 2006-174597 A | 6/2006 |

* cited by examiner

*Primary Examiner* — Katy M Ebner
(74) *Attorney, Agent, or Firm* — Kenyon & Kenyon LLP

(57) ABSTRACT

The charge-discharge power demand is set to the charging power, when the state of charge of the battery is less than the reference value or when the state of charge of the battery is more than or equal to the reference value and less than the reference value while the vehicle power demand is less than reference value. The charge-discharge power demand is set to the discharging power, when the state of charge of the battery is more than or equal to the reference value or when the state of charge of the battery is more than or equal to the reference value and less than the reference value and while the vehicle power demand is more than or equal to the reference value. The charge-discharge power demand is set without change in value to the last set the charge-discharge power demand, when the state of charge of the battery is more than or equal to the reference value and less than the reference value while the vehicle power demand is more than or equal to the reference value and less than the reference value. The engine and the motors are so controlled as the battery is charged or discharged with the charge-discharge power demand and the vehicle is driven with vehicle power demand.

15 Claims, 6 Drawing Sheets

VEHICLE AND CONTROL METHOD OF VEHICLE

This is a 371 national phase application of PCT/JP2008/052771 filed 19 Feb. 2008, claiming priority to Japanese Patent Application No. JP 2007-040656 filed 21 Feb. 2007, the contents of which are incorporated herein by reference.

TECHNICAL FIELD

The present invention relates to a vehicle and a control method of the vehicle.

BACKGROUND ART

One proposed vehicle comprises a generator having an engine and an alternator, a motor that outputs power to the rear wheels, and a battery that transmits electric power to and from the generator and the motor. In the proposed vehicle, the battery is charged or discharged according to the used SOC (state of charge) and accordingly a temperature rise of the battery is accelerated (see, for example, Patent Document 1). In this vehicle, the battery is actively charged by the generator when the battery does not have an allowance in the used SOC, and the battery is actively discharged with the motor consuming electric power output from the battery while reducing electric power generated from the generator or with the generator consuming electric power output from the battery when the battery has the allowance in the used SOC.

Patent Document 1: Japanese Patent Laid-Open No. 2005-341633

DISCLOSURE OF THE INVENTION

In such a case as in the above prior art vehicle where the battery is actively charged or discharged according to the used SOC (state of charge) of the battery, the fuel efficiency becomes worse due to the release of energy when the driving state of the vehicle is not taken into consideration.

In the vehicle of the invention and the control method of the vehicle, the object of the invention is to raise a temperature of an accumulator unit such as a secondary battery according to the driving state of the vehicle. In the vehicle of the invention and the control method of the vehicle, the object of the invention is also to raise a temperature of an accumulator unit such as a secondary battery rapidly.

In order to attain at least part of the above objects and the other related objects, the vehicle of the invention and the control method of the vehicle have the configurations discussed below.

According to one aspect, the present invention is directed to a first vehicle. The first vehicle comprises: an internal combustion engine capable of outputting power for driving the vehicle; a motor constructed to input and output power for driving the vehicle; an accumulator unit designed to transmit electric power to and from the motor; a power demand setting module configured to set a power demand required for driving the vehicle; and a controller configured to, at a temperature raising time that is a time when the accumulator unit is raised in temperature, control the internal combustion engine and the motor so that the accumulator unit is charged or discharged based on the set power demand while the vehicle is driven with a power corresponding to the set power demand.

The first vehicle according to this aspect of the invention, at the temperature raising time, that is a time when the accumulator unit is raised in temperature, controls the internal combustion engine and the motor so that the accumulator unit is charged or discharged based on the set power demand while the vehicle is driven with a power corresponding to the set power demand. This arrangement enables to raise a temperature of the accumulator unit according to the driving state of the vehicle, and enables to raise a temperature of the accumulator unit rapidly. As a matter of course, this arrangement enables the vehicle to drive with a power corresponding to the power demand.

In one preferable embodiment of the first vehicle of the invention, the controller, at the temperature raising time, controls the internal combustion engine and the motor so that the accumulator unit is discharged while the vehicle is driven with the power corresponding to the set power demand when the set power demand is more than, or equal to a first power, controls the internal combustion engine and the motor so that the accumulator unit is charged while the vehicle is driven with the power corresponding to the set power demand when the set power demand is less than a second power which is smaller than the first power, and controls the internal combustion engine and the motor so that the accumulator unit keeps being charged or discharged while the vehicle is driven with the power corresponding to the set power demand when the set power demand is less than the first power and more than or equal to the second power. This arrangement enables to charge or discharge the accumulator unit more appropriately according to the driving power of the vehicle.

In another preferable embodiment of the first vehicle of the invention, the vehicle further has a remaining capacity measurement unit configured to measure a remaining capacity that indicates an amount dischargeable from the accumulator unit. In this embodiment, the controller, at the temperature raising time, controls the internal combustion engine and the motor so that the accumulator unit is charged or discharged based on the measured remaining capacity. In this case, the controller may, at the temperature raising time, control the internal combustion engine and the motor so that the accumulator unit is discharged regardless of the set power demand while the vehicle is driven with the power corresponding to the set power demand when the measured remaining capacity is more than or equal to a first amount, and control the internal combustion engine and the motor so that the accumulator unit is charged regardless of the set power demand while the vehicle is driven with the power corresponding to the set power demand when the measured remaining capacity is less than a second amount which is smaller than the first amount. This arrangement enables to charge or discharge the accumulator unit more appropriately according to the remaining capacity of the accumulator unit.

In one preferable application of the first vehicle of the invention, the controller, at the temperature raising time, controls the internal combustion engine and the motor so that the accumulator unit is charged by a predetermined charging power to charge the accumulator unit, and controls the internal combustion engine and the motor so that the accumulator unit is discharged by a predetermined discharging power to discharge the accumulator unit. This arrangement enables to charge the accumulator unit with a predetermined charging power and enables to discharge the accumulator unit with a predetermined discharging power, and accordingly enables to charge or discharge the accumulator unit with stability.

In another preferable application of the first vehicle of the invention, the vehicle further has an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power, and constructed to transmit electric power to and from the accumulator unit. In this application, the motor is so connected with the driveshaft as to input and output power to and from the driveshaft. In this case, the electric power-mechanical power input and output assembly may have a generator connected with the accumulator unit and constructed to input and output power, and a three shaft-type power input output structure connected to three shafts, the driveshaft, the output shaft of the internal combustion engine, and a rotating shaft of the generator, and designed to input and output power to residual shaft based on powers input from and output to any two shafts among the three shafts.

According to another aspect, the present invention is directed to a second vehicle. The second vehicle comprises: a power generation unit designed to receive a supply of fuel and generate electric power; a motor constructed to input and output power for driving the vehicle; an accumulator unit designed to transmit electric power to and from the motor; a power demand setting module configured to set a power demand required for driving the vehicle; and a controller configured to, at a temperature raising time that is a time when the accumulator unit is raised in temperature, control the power generation unit and the motor so that the accumulator unit is charged or discharged based on the set power demand while the vehicle is driven with a power corresponding to the set power demand.

The second vehicle according to this aspect of the invention, at the temperature raising time that is a time when the accumulator unit is raised in temperature, controls the power generation unit and the motor so that the accumulator unit is charged or discharged based on the set power demand while the vehicle is driven with a power corresponding to the set power demand. This arrangement enables to raise a temperature of the accumulator unit according to the driving state of the vehicle, and enables to raise a temperature of the accumulator unit rapidly. As a matter of course, this arrangement enables the vehicle to drive with a power corresponding to the power demand. In this aspect of the invention, the 'power generation unit' may have an internal combustion engine and a generator designed to receive output power of the internal combustion engine and generate electric power, or the 'power generation unit' may have fuel cells.

In one preferable embodiment of the second vehicle of the invention, the controller, at the temperature raising time, controls the power generation unit and the motor so that the accumulator unit is discharged while the vehicle is driven with the power corresponding to the set power demand when the set power demand is more than or equal to a first power, controls the power generation unit and the motor so that the accumulator unit is charged while the vehicle is driven with the power corresponding to the set power demand when the set power demand is less than a second power which is smaller than the first power, and controls the power generation unit and the motor so that the accumulator unit keeps being charged or discharged while the vehicle is driven with the power corresponding to the set power demand when the set power demand is less than the first power and more than or equal to the second power. This arrangement enables to charge or discharge the accumulator unit more appropriately according to the driving power of the vehicle.

In another preferable embodiment of the second vehicle of the invention, the vehicle further has a remaining capacity measurement unit configured to measure a remaining capacity that indicates an amount dischargeable from the accumulator unit. In this embodiment the controller, at the temperature raising time, controls the power generation unit and the motor so that the accumulator unit is discharged regardless of the set power demand while the vehicle is driven with the power corresponding to the set power demand when the measured remaining capacity is more than or equal to a first amount, and controls the power generation unit and the motor so that the accumulator unit is charged regardless of the set power demand while the vehicle is driven with the power corresponding to the set power demand when the measured remaining capacity is less than a second amount which is smaller than the first amount. This arrangement enables to charge or discharge the accumulator unit more appropriately according to the remaining capacity of the accumulator unit.

According to another aspect, the present invention is directed to a first control method of a vehicle. The vehicle has an internal combustion engine capable of outputting power for driving the vehicle, a motor constructed to input and output power for driving the vehicle, and an accumulator unit designed to transmit electric power to and from the motor. The first control method, at a temperature raising time that is a time when the accumulator unit is raised in temperature, controls the internal combustion engine and the motor so that the accumulator unit is discharged while the vehicle is driven with a power corresponding to a required power demand for driving the vehicle when the required power demand is more than or equal to a first power, controls the internal combustion engine and the motor so that the accumulator unit is charged while the vehicle is driven with the power corresponding to the required power demand when the required power demand is less than a second power which is smaller than the first power, and controls the internal combustion engine and the motor so that the accumulator unit keeps being charged or discharged while the vehicle is driven with the power corresponding to the required power demand when the required power demand is less than the first power and more than or equal to the second power.

The first control method of the vehicle according to this aspect of the invention, at the temperature raising time that is a time when the accumulator unit is raised in temperature that is a time when the accumulator unit is raised in temperature, controls the internal combustion engine and the motor so that the accumulator unit is discharged while the vehicle is driven with a power corresponding to a required power demand for driving the vehicle when the required power demand is more than or equal to a first power, controls the internal combustion engine and the motor so that the accumulator unit is charged while the vehicle is driven with the power corresponding to the required power demand when the required power demand is less than a second power which is smaller than the first power, and controls the internal combustion engine and the motor so that the accumulator unit keeps being charged or discharged while the vehicle is driven with the power corresponding to the required power demand when the required power demand is less than the first power and more than or equal to the second power. This arrangement enables to charge or discharge the accumulator unit according to a required power demand for driving the vehicle, and accordingly enables to raise a temperature of the accumulator unit rapidly. As a matter of course, this arrangement enables the vehicle to drive with a power corresponding to the power demand.

In one preferable embodiment of the first control method of the vehicle of the invention, the control method, at the temperature raising time, controls the internal combustion engine and the motor so that the accumulator unit is discharged regardless of the required power demand while the vehicle is driven with the power corresponding to the required power demand when a remaining capacity that indicates an amount dischargeable from the accumulator unit is more than or equal to a first amount, and controls the internal combustion engine and the motor so that the accumulator unit is charged regardless of the required power demand while the vehicle is driven with the power corresponding to the required power demand when the remaining capacity is less than a second amount which is smaller than the first amount. This arrangement enables to charge or discharge the accumulator unit more appropriately according to the remaining capacity of the accumulator unit.

According to another aspect, the present invention is directed to a second control method of a vehicle. The vehicle has a power generation unit designed to receive a supply of fuel and generate electric power, a motor constructed to input and output power for driving the vehicle, and an accumulator unit designed to transmit electric power to and from the motor. The second control method, at a temperature raising time that is a time when the accumulator unit is raised in temperature, controls the power generation unit and the motor so that the accumulator unit is discharged while the vehicle is driven with a power corresponding to a required power demand for driving the vehicle when the required power demand is more than or equal to a first power, controls the power generation unit and the motor so that the accumulator unit is charged while the vehicle is driven with the power corresponding to the required power demand when the required power demand is less than a second power which is smaller than the first power, and controls the power generation unit and the motor so that the accumulator unit keeps being charged or discharged while the vehicle is driven with the power corresponding to the required power demand when the required power demand is less than the first power and more than or equal to the second power.

The second control method of the vehicle according to this aspect of the invention, at a temperature raising time that is a time when the accumulator unit is raised in temperature, controls the power generation unit and the motor so that the accumulator unit is discharged while the vehicle is driven with a power corresponding to a required power demand for driving the vehicle when the required power demand is more than or equal to a first power, controls the power generation unit and the motor so that the accumulator unit is charged while the vehicle is driven with the power corresponding to the required power demand when the required power demand is less than a second power which is smaller than the first power, and controls the power generation unit and the motor so that the accumulator unit keeps being charged or discharged while the vehicle is driven with the power corresponding to the required power demand when the required power demand is less than the first power and more than or equal to the second power. This arrangement enables to charge or discharge the accumulator unit according to a required power demand for driving the vehicle, and accordingly enables to raise a temperature of the accumulator unit rapidly. As a matter of course, this arrangement enables the vehicle to drive with a power corresponding to the power demand.

In one preferable embodiment of the second control method of the vehicle of the invention, the control method, at the temperature raising time, controls the power generation unit and the motor so that the accumulator unit is discharged regardless of the required power demand while the vehicle is driven with the power corresponding to the required power demand when a remaining capacity that indicates an amount dischargeable from the accumulator unit is more than or equal to a first amount, and controls the power generation unit and the motor so that the accumulator unit is charged regardless of the required power demand while the vehicle is driven with the power corresponding to the required power demand when the remaining capacity is less than a second amount which is smaller than the first amount. This arrangement enables to charge or discharge the accumulator unit more appropriately according to the remaining capacity of the accumulator unit.

BEST MODES OF CARRYING OUT THE INVENTION

Figure 1:
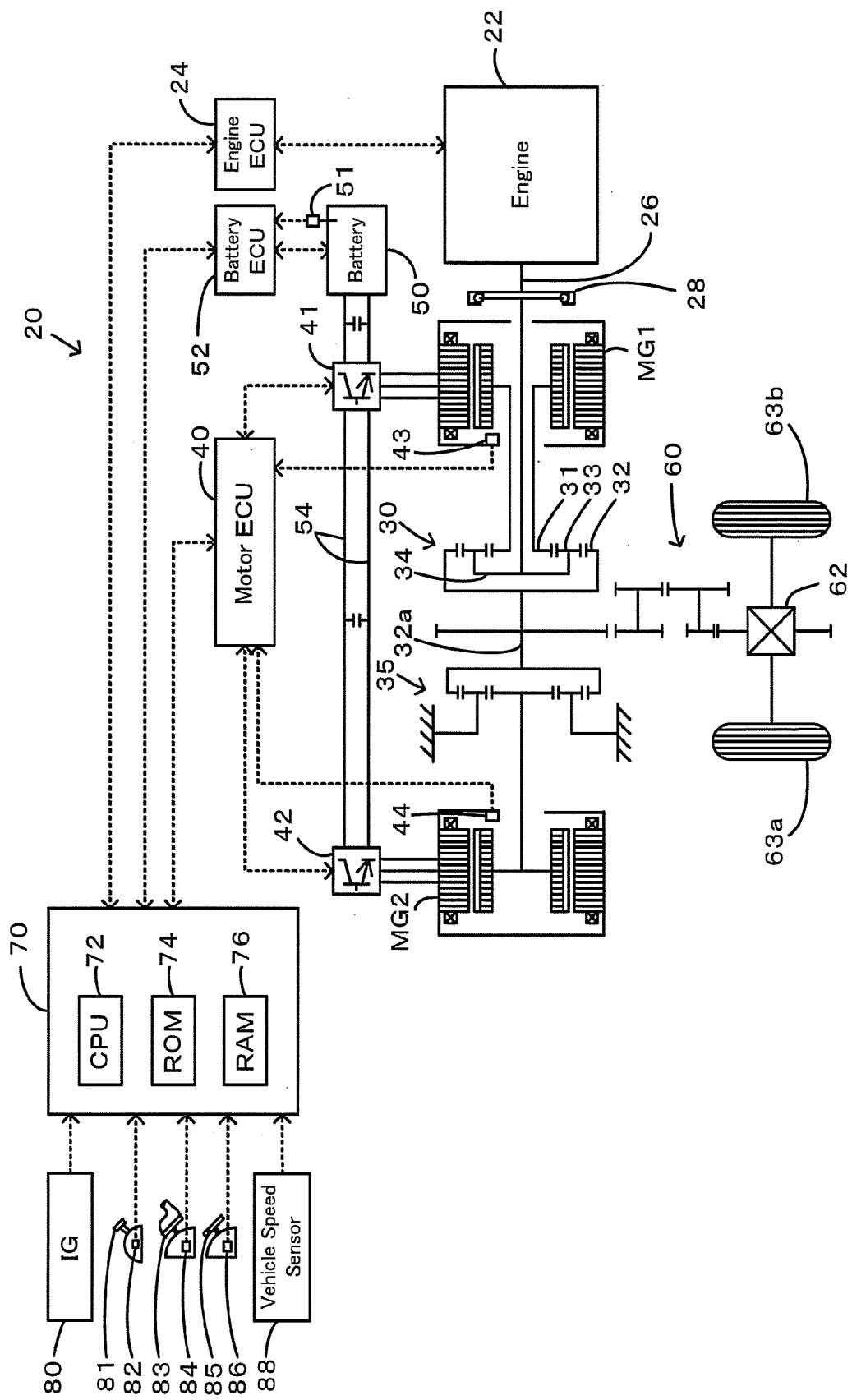
FIG. 1 schematically illustrates the configuration of a hybrid vehicle 20 in one embodiment of the invention.

One mode of carrying out the invention is discussed below as a preferred embodiment. FIG. 1 schematically illustrates the configuration of a hybrid vehicle 20 in one embodiment according to the invention. As illustrated, the hybrid vehicle 20 of the embodiment includes the engine 22, a three shaft-type power distribution integration mechanism 30 connected via a damper 28 to a crankshaft 26 or an output shaft of the engine 22, a motor MG1 connected to the power distribution integration mechanism 30 and designed to have power generation capability, a reduction gear 35 attached to a ring gear shaft 32a or a driveshaft linked with the power distribution integration mechanism 30, a motor MG2 connected to the reduction gear 35, and a hybrid electronic control unit 70 configured to control the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements. The engine ECU 24 also computes a rotation speed of the crankshaft 26, which is equivalent to a rotation speed Ne of the engine 22, based on the crank position from the crank positions sensor attached to the crankshaft 26.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also performs arithmetic operations to compute rotation speeds Nm1 and Nm2 of the motors MG1 and MG2 from the output signals of the rotational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution, integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
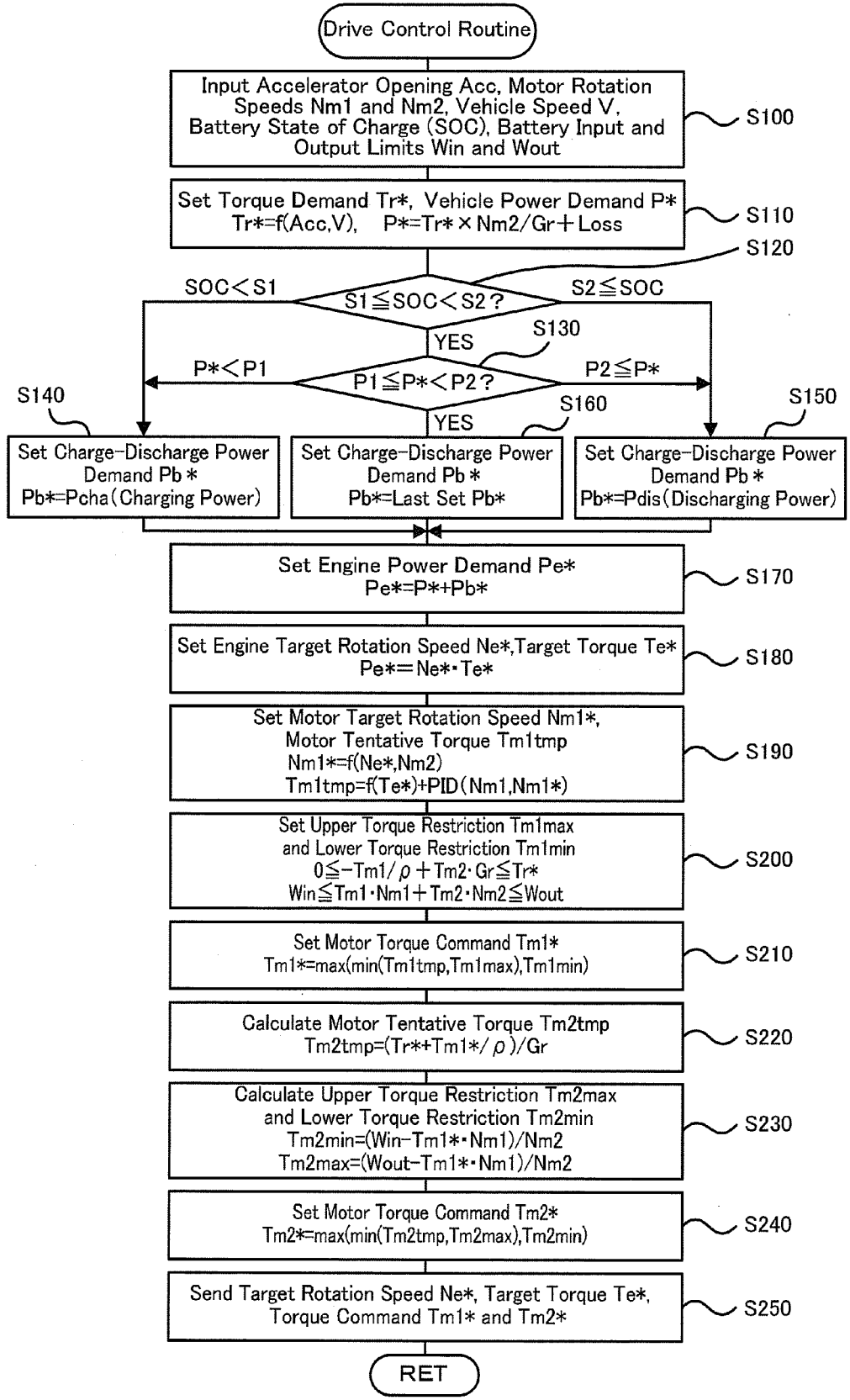
FIG. 2 is a flowchart showing a drive control routine executed by a hybrid electronic control unit 70 in the embodiment.

The description regards the operations of the hybrid vehicle 20 of the embodiment having the configuration discussed above, especially a series of operation control to raise a temperature of the battery 50. FIG. 2 is a flowchart showing a drive control routine executed by the hybrid electronic control unit 70 when the battery 50 is at a low temperature. This routine is performed repeatedly until the battery 50 reaches a temperature (for example, 0° C. or 5° C.) at which the battery 50 is enabled to function sufficiently at preset time intervals (for example, at every several msec).

In the drive control routine, the CPU 72 of the hybrid electronic control unit 70 inputs various data required for drive control, for example, the accelerator opening Acc from the accelerator pedal position sensor 84, the vehicle speed V from the vehicle speed sensor 88, the rotation speeds Nm1 and Nm2 of the motors MG1 and MG2, the state of charge (SOC) of the battery 50, and the input limit Win and the output limit Wout of the battery 50 (step S100). The rotation speeds Nm1 and Nm2 of the motors MG1 and MG2 are computed from the rotational positions of the rotors in the motors MG1 and MG2 detected by the rotational position detection sensors 43 and 44 and are input, from the motor ECU 40 by communication. The input limit Win and the output limit Wout of, the battery 50 are set based on the battery temperature Tb and the state of charge (SOC) of the battery 50 and are input from the battery ECU 52 by communication.

Figure 3:
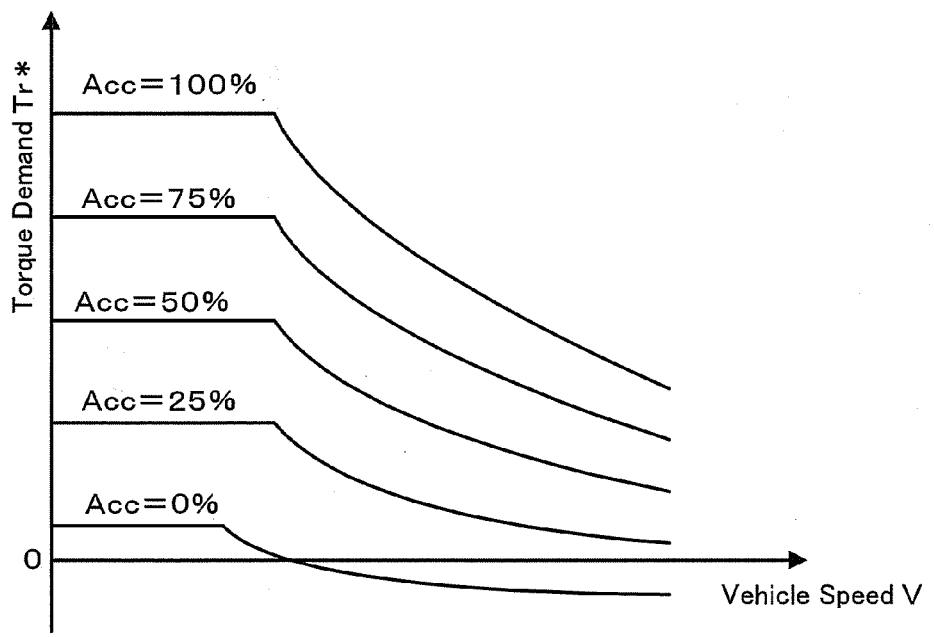
FIG. 3 shows one example of the torque demand setting map.

After the data input, the CPU 72 sets a torque demand Tr* to be output to, the ring gear shaft 32a or the driveshaft linked with the drive wheels 63a and 63b as a torque required for the hybrid vehicle 20 and a vehicle power demand P* required for the hybrid vehicle 20 based on the input accelerator opening Acc and the input vehicle speed V (step S110). A concrete procedure of setting the torque demand Tr* in this embodiment provides and stores in advance variations in torque demand Tr* against the vehicle speed V with regard to various settings of the accelerator opening Acc as a torque demand setting map in the ROM 74 and reads the torque demand Tr* corresponding to the given accelerator opening Acc and the given vehicle speed V from this torque demand setting map. One example of the torque demand setting map is shown in FIG. 3. The vehicle power demand P* is calculated as the sum of the product of the set torque demand Tr* and a rotation speed Nr of the ring gear shaft 32a and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

It is then determined whether the state of charge (SOC) of the battery 50 is in the range from a reference value S1 to a reference value S2 and whether the set vehicle power demand P* is in the range from a reference value P1 to a reference value P2 (step S120, S130). The reference value S1 is set as a state of charge representing the state of charge (SOC) of the battery 50 which should not be discharged any more, for example, 40% or 50%. The reference value S2 is set as a state of charge representing the state of charge (SOC) of the battery 50 which should not be charged any more, for example, 65% or 75%. The reference value P1 is set as a relatively small value of the vehicle power demand P*, for example, the value equivalent to 10% or 20% of the maximum of the vehicle power demand. The reference value P2 is set as a relatively large value of the vehicle power demand P*, for example, the value equivalent to 40% or 50% of the maximum of the vehicle power demand.

When the state of charge (SOC) of the battery 50 is less than the reference value S1, a charge-discharge power demand Pb* is set to a charging power Pcha regardless of the vehicle power demand P* (step S140). When the state of charge (SOC) of the battery 50 is more than or equal to the reference value S2, the charge-discharge power demand Pb* is set to a discharging power Pdis regardless of the vehicle power demand P* (step S150). In this embodiment, the charging power Pcha is set as a relatively large electric power within an electric power range appropriate to charge the battery 50, and the discharging power Pdis is set as a relatively large electric power within an electric power range appropriate to discharge the battery 50. When the state of charge (SOC) of the battery 50 is more than or equal to the reference value S1 and less than the reference value S2, the charge-discharge power demand Pb* is set to the charging power Pcha in the case of the vehicle power demand P* less than the reference value P1 (step S140), and the charge-discharge power demand Pb* is set to the discharging power Pdis in the case of the vehicle power demand P* more than or equal to the reference value P2 (step S150). When the state of charge (SOC) of the battery 50 is more than or equal to the reference value S1 and less than the reference value S2 while the vehicle power demand P* is more than or equal to the reference value P1 and less than P2, the charge-discharge power demand Pb* is set, without change in value, to the charge-discharge power demand Pb* that is set in the last execution of this routine. Prior to the first execution of this routine in this embodiment, the charge-discharge power demand Pb* is set to the charging power Pcha as an initial value. The discharging power Pdis may be used in place of the charging power Pcha as the initial value.

Figure 4:
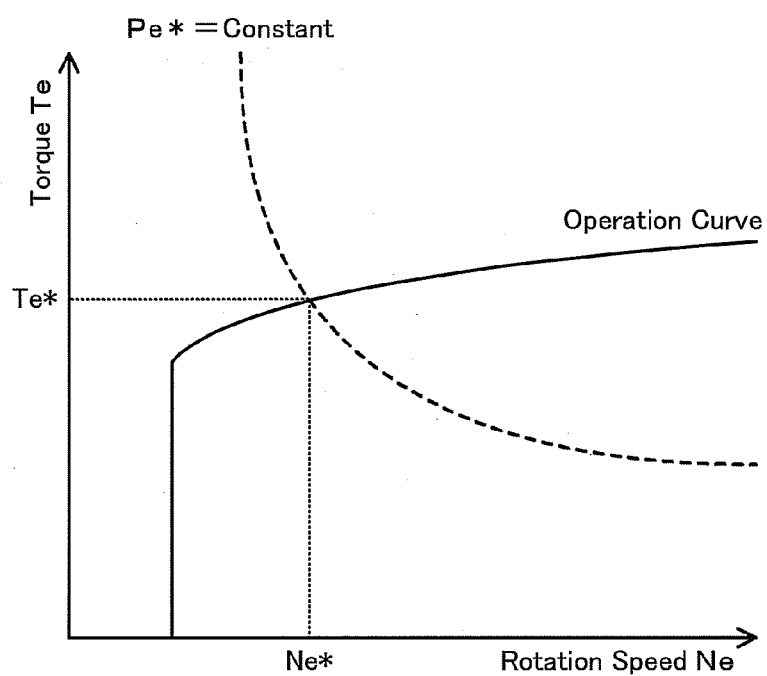
FIG. 4 shows an operation curve of the engine 22 used to set the target rotation speed Ne* and the target torque Te*.

After the setting of the charge-discharge power demand Pb*, an engine power demand Pe* is set to the sum of the vehicle power demand P* and the set charge-discharge power demand Pb* (step S170), and a target rotation speed Ne* and a target torque Te* defining a target drive point of the engine 22 are set based on the set engine power demand Pe* (step S180). In this embodiment, the target rotation speed Ne* and the target torque Te* are determined according to an operation curve of ensuring efficient operation of the engine 22 and a curve of the engine power demand Pe*. FIG. 4 shows an operation curve of the engine 22 used to set the target rotation speed Ne* and the target torque Te*. As clearly shown in FIG. 4, the target rotation speed Ne* and the target torque Te* are given as an intersection of the operation curve and a curve of constant power demand Pe* (=Ne*×Te*).

The CPU 72 subsequently calculates a target rotation speed Nm1* of the motor MG1 from the target rotation speed Ne* of the engine 22, the rotation speed Nm2 of the motor MG2, and a gear ratio ρ of the power distribution integration mechanism 30 according to Equation (1) given below, while calculating a tentative torque Tm1tmp as a provisional value of torque to be output from the motor MG1 from the calculated target rotation speed Nm1* and the input rotation speed Nm1 of the motor MG1 according to Equation (2) given below (step S190):

$$Nm1^* = Ne^* \cdot (1+\rho)/\rho - Nm2/(Gr\cdot\rho) \tag{1}$$

$$Tm1tmp = \rho \cdot Te^*/(1+\rho) + k1(Nm1^* - Nm1) + k2\int(Nm1^* - Nm1)dt \tag{2}$$

Figure 5:
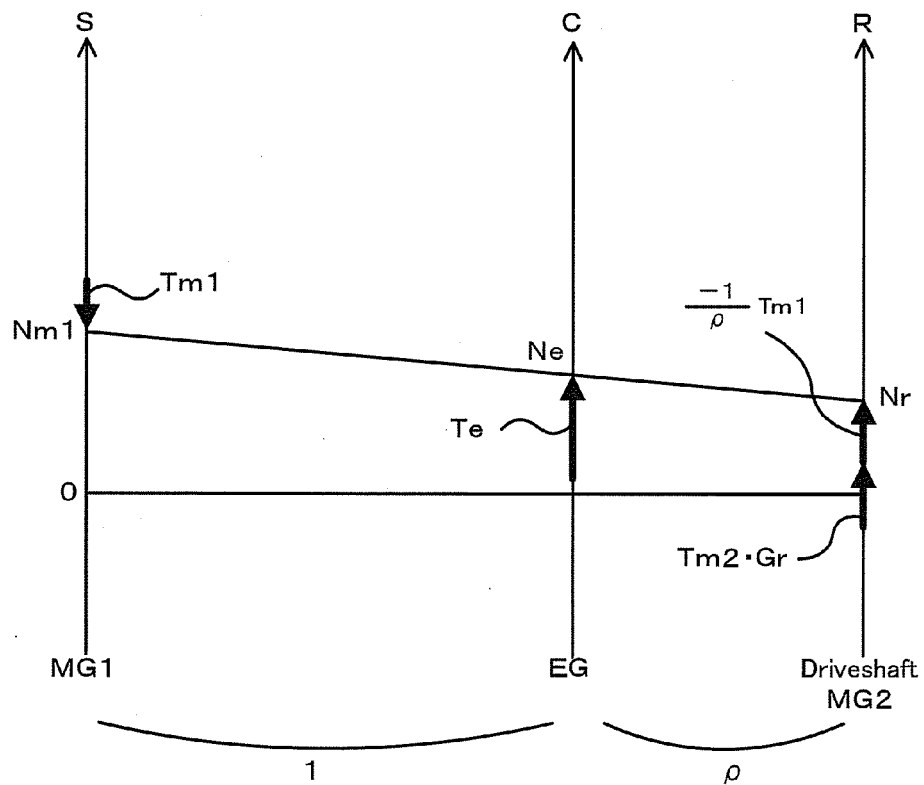
FIG. 5 is an alignment chart showing torque-rotation speed dynamics of the respective rotational elements included in the power distribution integration mechanism 30.

Equation (1) is a dynamic relational expression of respective rotational elements included in the power distribution integration mechanism 30. FIG. 5 is an alignment chart showing torque-rotation speed dynamics of the respective rotational elements included in the power distribution integration mechanism 30 when the vehicle is running in the state in which power is generated from the engine 22. The left axis 'S' represents a rotation speed of the sun gear 31 that is equivalent to the rotation speed Nm1 of the motor MG1. The middle axis 'C' represents a rotation speed of the carrier 34 that is equivalent to the rotation speed Ne of the engine 22. The right axis 'R' represents the rotation speed Nr of the ring gear 32 obtained by dividing the rotation speed Nm2 of the motor MG2 by the gear ratio Gr of the reduction gear 35. Equation (1) is readily introduced from this alignment chart. Two thick arrows on the axis 'R' respectively show a torque applied to the ring gear shaft 32a by output of the torque Tm1 from the motor MG1, and a torque applied to the ring gear shaft 32a via the reduction gear 35 by output of the torque Tm2 from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

The CPU 72 subsequently sets an upper torque restriction Tm1max and a lower torque restriction Tm1min as allowable minimum and maximum torques that may be output from the motor MG1 to satisfy both Expressions (3) and (4) given below (step S200):

$$0 \leq -Tm1/\rho + Tm2 \cdot Gr \leq Tr^* \quad (3)$$

$$Win \leq Tm1 \cdot Nm1 + Tm2 \cdot Nm2 \leq Wout \quad (4)$$

A torque command Tm1* of the motor MG1 is set by limiting the set tentative torque Tm1tmp with the set upper torque restriction Tm1max and lower torque restriction Tm1min according to Equation (5) given below (step S210):

$$Tm1^* = \max(\min(Tm1tmp, Tm1\max), Tm1\min) \quad (5)$$

Figure 6:
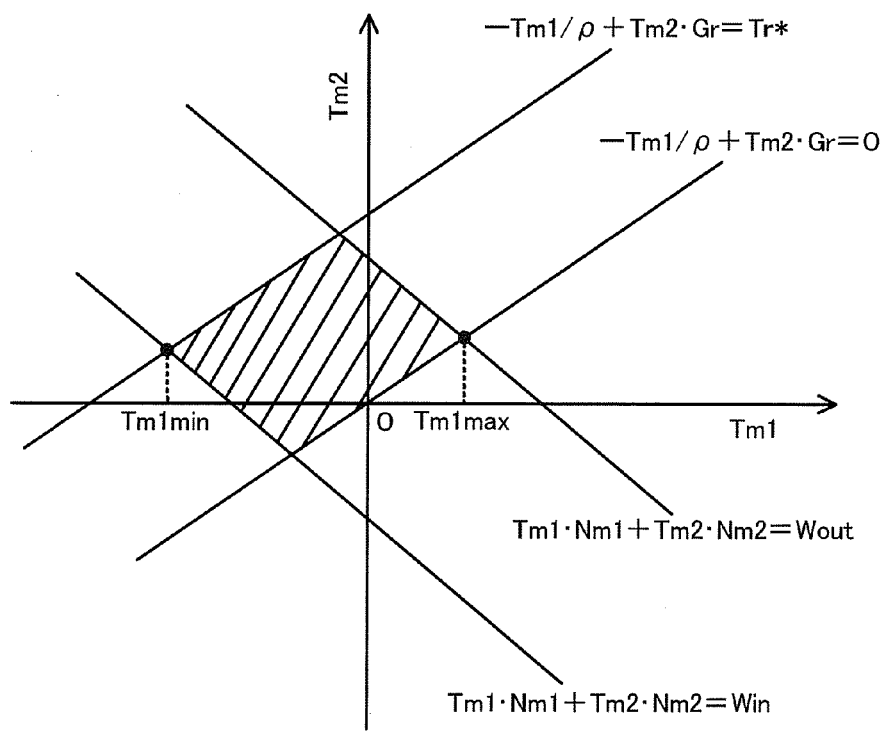
FIG. 6 shows one set of the examples of the upper torque restriction Tm1max and the lower torque restriction Tm1min.

Expression (3) is a relational expression showing that the sum of the torques output from the motors MG1 and MG2 to the ring gear shaft 32a is within a range of 0 to the torque demand Tr*. Expression (4) is a relational expression showing that the sum of the electric powers input into and output from the motors MG1 and MG2 is in a range of the input limit Win and the output limit Wout of the battery 50. One set of the examples of the upper torque restriction Tm1max and the lower torque restriction Tm1min is shown in FIG. 6. The upper torque restriction Tm1max and the lower torque restriction Tm1min are obtained as a maximum value and a minimum value of the torque Tm1 in a hatched area.

The CPU 72 then adds the result of division of the torque command Tm1* by the gear ratio ρ of the power distribution integration mechanism 30 to the torque demand Tr*, and specifies a tentative torque Tm2tmp as a provisional value of torque to be output from the motor MG2 by dividing the result of the addition by the gear ratio Gr of the reduction gear 35, according to Equation (6) given below (step S220):

$$Tm2tmp = (Tr^* + Tm1^*/\rho)/Gr \quad (6)$$

The CPU 72 subsequently calculates a lower torque restriction Tm1min and an upper torque restriction Tm1max as allowable minimum and maximum torques output from the motor MG2 according to Equations (7) and (8) given below (step S230):

$$Tm2\min = (Win - Tm1^* Nm1)/Nm2 \quad (7)$$

$$Tm2\max = (Wout - Tm1^* Nm1)/Nm2 \quad (8)$$

The lower torque restriction Tm2min and the upper torque restriction Tm2max are obtained by dividing respective differences between the input limit Win or the output limit Wout of the battery 50 and power consumption (power generation) of the motor MG1, which is the product of the calculated torque command Tm1* and the current rotation speed Nm1 of the motor MG1, by the current rotation speed Nm2 of the motor MG2. The CPU 72 then limits the specified tentative torque Tm2tmp by the lower torque restriction Tm2 min and upper torque restriction Tm2max according to Equation (9) given below to set a torque command Tm2* of the motor MG2 (step S240):

$$Tm2^* = \max(\min(Tm2tmp, Tm2\max), Tm2\min) \quad (9)$$

Equation (6) given above is readily introduced from the alignment chart of FIG. 5.

After setting the target rotation speed Ne* and the target torque Te* of the engine 22 and the torque commands Tm1* and Tm2* of the motors MG1 and MG2, the CPU 72 sends the settings of the target rotation speed Ne* and the target torque Te* of the engine 22 to the engine ECU 24 and the settings of the torque commands Tm1* and Tm2* of the motors MG1 and MG2 to the motor ECU 40 (step S250) and terminates the drive control routine. In response to reception of the settings of the target rotation speed Ne* and the target torque Te*, the engine ECU 24 performs required controls including intake air flow regulation, ignition control, and fuel injection control of the engine 22 to drive the engine 22 at the specific drive point defined by the combination of the target rotation speed Ne* and the target torque Te*. In response to reception of the settings of the torque commands Tm1* and Tm2*, the motor ECU 40 performs switching control of the inverter 41, 42 to drive the motor MG1 with the torque command Tm1* and the motor MG2 with the torque command Tm2*. Such control enables the torque demand Tr* within the range of the input limit Win or the output limit Wout of the battery 50 to be output to the ring gear shaft 32a or the driveshaft for driving the hybrid vehicle 20 while operating the engine 22 efficiently, and enables to charge or discharge the battery 50 with the charging power Pcha or the discharging power Pdis.

In the hybrid vehicle 20 of the embodiment described above, the charge-discharge power demand Pb* is set to the charging power Pcha when the vehicle power demand P* is less than the reference value P1, the charge-discharge power demand Pb* is set to the discharging power Pdis when the vehicle power demand P* is more than or equal to the reference value P2, and the charge-discharge power demand Pb* is set without change in value to the last set charge-discharge power demand Pb* when the vehicle power demand P* is more than or equal to the reference value P1 and less than the reference value P2. The engine 22 and the motor MG1 and MG2 are controlled according to the settings of the target rotation speed Ne* and target rotation torque Te* of the engine 22 and the torque commands Tm1* and Tm2* so that the battery 50 is charged or discharged within an allowable range of the battery 50 with the charge-discharge power demand Pb* and the hybrid vehicle 20 is driven with the vehicle power demand P* (torque demand Tr*). This arrangement enables to charge or discharge the battery 50 with the charge-discharge power demand Pb* corresponding to the vehicle power demand P*, and enables to raise the temperature of the battery 50 rapidly. In the hybrid vehicle 20 of the embodiment, the charging power Pcha and discharging power Pdis, which are set as relatively large electric powers within the electric power ranges appropriate for charging or discharging the battery 50, are used to charge or discharge the battery 50. This arrangement enables to raise the temperature of the battery 50 rapidly. In the hybrid vehicle 20 of the embodiment, the charge-discharge power demand Pb* is set to the charging power Pcha regardless of the vehicle power demand P* when the state of charge (SOC) of the battery 50 is less than the reference value S1, and the charge-discharge power demand Pb* is set to the discharging power Pdis regardless of the vehicle power demand P* when the state of charge (SOC) of the battery 50 is more than or equal to the reference value S2. This arrangement enables to charge or discharge the battery 50 according to the state of charge (SOC) of the battery 50. As a matter of course, the hybrid vehicle 20 is enabled to drive with a power corresponding to the vehicle power demand P*, that is, with a torque corresponding to the torque demand Tr*.

In the hybrid vehicle 20 of the embodiment, the charge-discharge power demand Pb* is set to the charging power Pcha regardless of the vehicle power demand P* when the state of charge (SOC) of the battery 50 is less than the reference value S1, and the charge-discharge power demand Pb* is set to the discharging power Pdis regardless of the vehicle power demand P* when the state of charge (SOC) of the battery 50 is more than or equal to the reference value S2. This is not essential and such charge or discharge according to the state of charge (SOC) of the battery 50 may not be performed.

In the hybrid vehicle 20 of the embodiment, the charge-discharge power demand Pb* is set to the charging power Pcha when the vehicle power demand P* is less than the reference value P1, the charge-discharge power demand Pb* is set to the discharging power Pdis when the vehicle power demand P* is more than or equal to the reference value P2, and the charge-discharge power demand P* is set without change in value to the last set charge-discharge power demand Pb* when the vehicle power demand P* is more than or equal to the reference value P1 and less than the reference value P2. In one modified embodiment, the charge-discharge power demand Pb* may be set to the charging power Pcha or discharging power Pdis using not two reference values P1 and P2 but one reference value Pref. Thus, the charge-discharge power demand Pb* may be set to the charging power Pcha when the vehicle power demand P* is less than the reference value Pref, and set to the discharging power Pdis when the vehicle power demand P* is more than or equal to the reference value Pref.

In the hybrid vehicle 20 of the embodiment, the charging power Pcha and discharging power Pdis, which are set as relatively large electric powers within the electric power ranges appropriate for charging or discharging the battery 50, are used to charge or discharge the battery 50. In one modified embodiment, the charging power Pcha and discharging power Pdis may be any powers set as relatively large electric powers within the electric power ranges appropriate for charging or discharging g the battery 50. The charging power Pcha and discharging power Pdis may be electric powers varying according to the state of charge (SOC) of the battery 50.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 7:
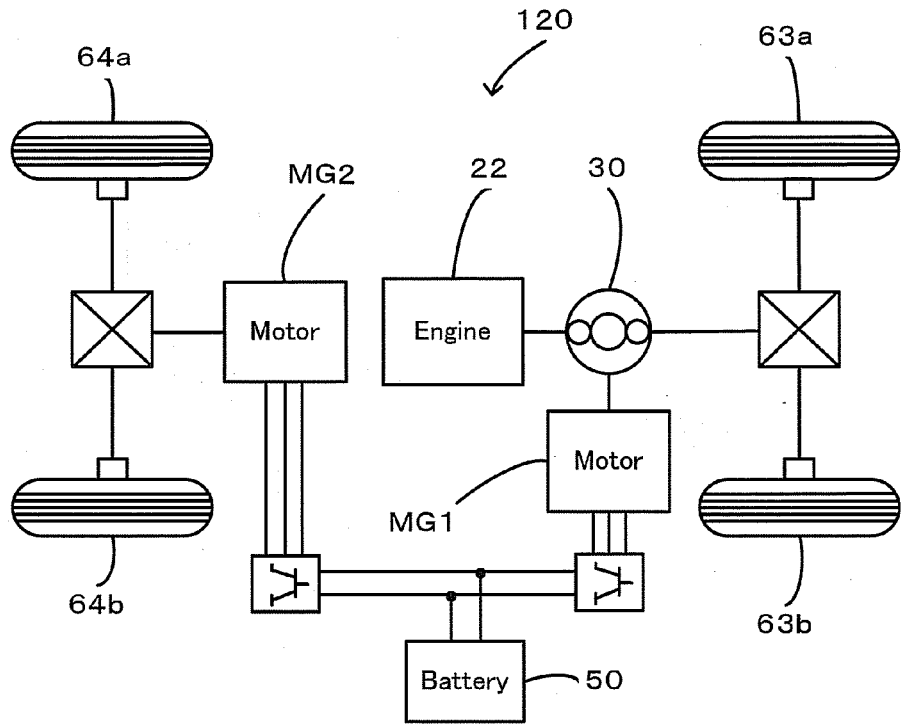
FIG. 7 schematically illustrates the configuration of another hybrid vehicle 120 in one modified example.

In the hybrid vehicle 20 of the embodiment, the power of the motor MG2 is converted by the reduction gear 35 and is output to the ring gear shaft 32a. The technique of the invention is also applicable to a hybrid vehicle 120 of a modified structure shown in FIG. 7. In the hybrid vehicle 120 of FIG. 7, the power of the motor MG2 is connected to another axle (an axle linked with wheels 64a and 64b) that is different from the axle connecting with the ring gear shaft 32a (the axle linked with the drive wheels 63a and 63b).

Figure 8:
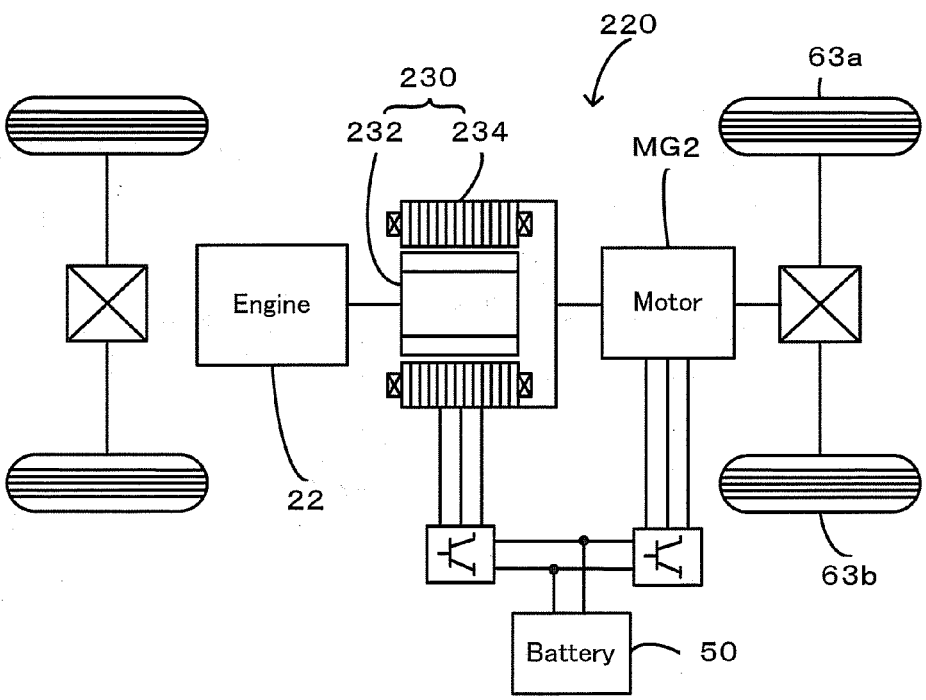
FIG. 8 schematically illustrates the configuration of still another hybrid vehicle 220 in another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 220 of another modified structure shown in FIG. 8. The hybrid vehicle 220 of FIG. 8 is equipped with a pair-rotor motor 230. The pair-rotor motor 230 includes an inner rotor 232 connected to the crankshaft 26 of the engine 22 and an outer rotor 234 connected to a driveshaft for outputting power to the drive wheels 63a and 63b. The pair-rotor motor 230 transmits part of the output power of the engine 22 to the driveshaft, while converting the residual engine output power into electric power.

Figure 9:
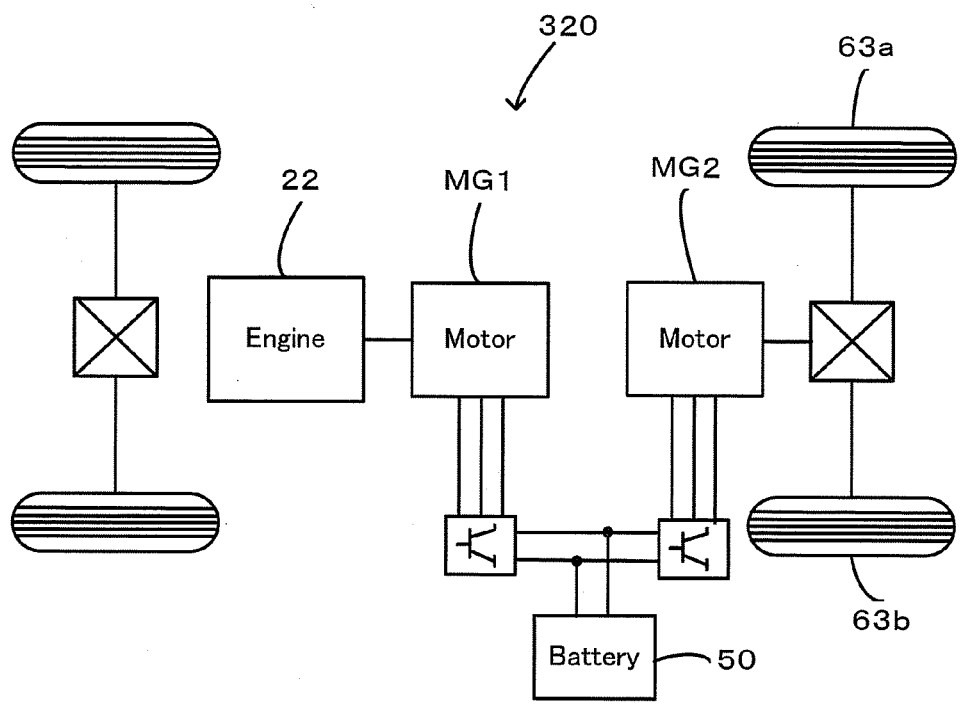
FIG. 9 schematically illustrates the configuration of another hybrid vehicle 320 in still another modified example.

In the hybrid vehicle 20 of the embodiment, the power of the engine 22 is output via the power distribution integration mechanism 30 to the ring gear shaft 32a or the driveshaft linked with the drive wheels 63a and 63b. The technique of the invention is also applicable to a hybrid vehicle 320 of another modified structure shown in FIG. 9. The hybrid vehicle 320 of FIG. 9 is equipped with the motor MG1 for power generation attached to the engine 22 and with the motor MG2 for driving.

Figure 10:
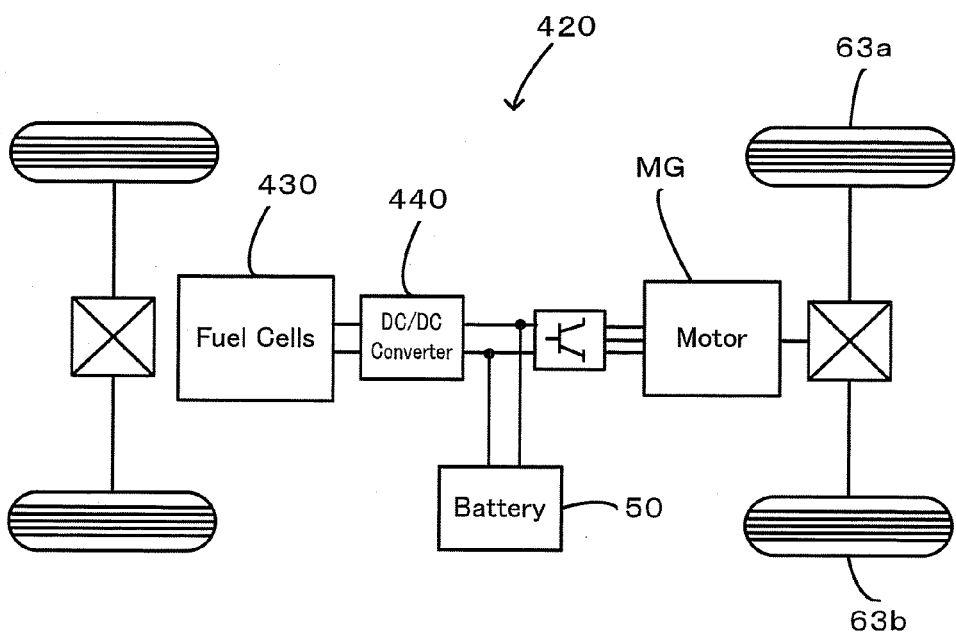
FIG. 10 schematically illustrates the configuration of a fuel-cell vehicle 420 in another modified example.

The embodiment and its modified examples describes the hybrid vehicles of various configurations. The technique of the invention is also applicable to a fuel-cell vehicle 420 shown in FIG. 10. The fuel-cell vehicle 420 of FIG. 10 is configured to step up the voltage of an electric power generated from fuel cells 430 by a DC-to-DC converter 440 and the electric power, where the voltage is stepped up, is supplied to the battery 50 and a motor MG.

The embodiment and its modified examples regard application of the invention to the hybrid vehicles and the fuel-cell vehicle. The principle of the invention may be actualized by diversity of other applications, for example, vehicles other than motor vehicles as well as a control method of such a vehicle.

The primary elements in the embodiment and its modified examples are mapped to the primary constituents in the claims of the invention as described below. The engine 22 in the embodiment corresponds to the 'internal combustion engine' in the claims of the invention. The motor MG2 in the embodiment corresponds to the 'motor' in the claims of the invention. The battery 50 in the embodiment corresponds to the 'accumulator unit' in the claims of the invention. The hybrid electronic control unit 70 executing the processing of step S110 in the drive control routine of FIG. 2 to set the torque demand Tr* based on the accelerator opening Acc and the vehicle speed V and set the vehicle power demand P* based on the set torque demand Tr* in the embodiment corresponds to the 'power demand setting module' in the claims of the invention. The combination of the hybrid electronic control unit 70 executing the processing of the steps 120 to S250 in the drive control routine of FIG. 2, the engine ECU 24 controlling the engine 22 based on the received target rotation speed Ne* and target torque Te*, and the motor ECU 40 controlling the motors MG1 and MG2 based on the received torque commands Tm1* and Tm2* in the embodiment corresponds to the 'controller' in the claims of the invention. The hybrid electronic control unit 70 sets the charge-discharge power demand Pb* to the charging power Pcha regardless of the vehicle power demand P* when the state of charge (SOC) of the battery is less than the reference value S1, and sets the charge-discharge power demand Pb* to the discharging power Pdis regardless of the vehicle power demand P* when the state of charge (SOC) of the battery 50 is more than or equal to the reference value S2. When the state of charge (SOC) of the battery 50 is more than or equal to the reference value S1 and less than the reference value S2, the hybrid electronic control unit 70 sets the charge-discharge power demand Pb* to the charging power Pcha when the vehicle power demand P* is less than the reference value P1, sets the charge-discharge power demand Pb* to the discharging power Pdis when the vehicle power demand P* is more than or equal to the reference value P2, and sets the charge-discharge power demand Pb* without change in value to the last set charge-discharge power demand Pb* when the vehicle power demand P* is more than or equal to the reference value P1 and less than the reference value P2. The hybrid electronic control unit 70 sets the target rotation speed Ne* and target torque Te* and the torque commands Tm1* and Tm2* so that the battery 50 is charged or discharged within the range from the input limit Win to the output limit Wout with the charge-discharge power demand Pb* and the hybrid vehicle 20 is driven with the vehicle power demand P* (torque demand Tr*), and sends the set target rotation speed Ne* and target torque Te* and the torque commands Tm1* and Tm2*. The battery ECU 52 calculating the state of charge (SOC) of the battery 50 from an integrated value of the charge-discharge current measured by the current sensor (not shown) in the embodiment corresponds to the 'remaining capacity measurement unit' in the claims of the invention. The combination of the power distribution integration mechanism 30 and the motor MG1 in the embodiment corresponds to the 'electric power-mechanical power input output assembly' in the claims of the invention. The motor MG1 in the embodiment corresponds to the 'generator' in the claims of the invention. The power distribution integration mechanism 30 in the embodiment corresponds to the 'three shaft-type power input output structure' in the claims of the invention. The pair-rotor motor 230 in the modified example also corresponds to the 'electric power-mechanical power input output assembly' in the claims of the invention. The combination of the engine 22 with the motor MG1 of the hybrid vehicle 320 in the modified example corresponds to the 'power generation unit' in the claims of the invention, and the fuel cells 430 in the modified example corresponds to the 'power generation unit' in the claims of the invention.

The 'internal combustion engine' is not restricted to the internal combustion engine designed to consume a hydrocarbon fuel, such as gasoline or light oil, and thereby output power, but may be an internal combustion engine of any other design, for example, a hydrogen engine. The 'motor' is not restricted to the motor MG2 constructed as a synchronous motor generator but may be any type of motor constructed to input and output power for driving the vehicle, for example, an induction motor. The 'accumulator unit' is not restricted to the battery 50 as a secondary battery but may be a capacitor or any other storage unit designed to transmit electric power to and from the motor or the electric power-mechanical power input output assembly. The 'power demand setting module' is not restricted to the arrangement of setting the vehicle power demand P* using the set torque demand Tr* set based on the accelerator opening Acc and the vehicle speed V but may be any other arrangement of setting a power demand for driving the vehicle, for example, an arrangement of setting the vehicle power demand P* using a torque demand corresponding only to the accelerator opening Acc or an arrangement of setting the vehicle power demand P* using a torque demand set based on a location of the vehicle on a preset drive route. The 'controller' is not restricted to the combination of the hybrid electronic control unit 70 with the engine ECU 24 and the motor ECU 40 but may be actualized by a single electronic control unit. The 'controller' is not restricted to the arrangement of controlling the engine 22 and the motor MG1 and MG2 according to the set target rotation speed Ne* and target torque Te* and the torque commands Tm1* and Tm2* so that the battery 50 is charged or discharged within the range from the input limit Win to the output limit Wout with the charge-discharge power demand Pb* and the hybrid vehicle 20 is driven with the vehicle power demand P* (torque demand Tr*), the arrangement wherein the charge-discharge power demand Pb* is set to the charging power Pcha regardless of the vehicle power demand P* when the state of charge (SOC) of the battery 50 is less than the reference value S1, the charge-discharge power demand Pb* is set to the charge-discharge power demand Pb* to the discharging power Pdis regardless of the vehicle power demand P* when the state of charge (SOC) of the battery 50 is more than or equal to the reference value S2, and the charge-discharge power demand Pb* is set, when the state of charge (SOC) of the battery 50 is more than or equal to the reference value 51 and less than the reference value S2, to the charging power Pcha when the vehicle power demand P* is less than the reference value P1, to the discharging power Pdis when the vehicle power demand P* is more than or equal to the reference value P2, and to the last set charge-discharge power demand Pb* without change in value when the vehicle power demand P* is more than or equal to the reference value P1 and less than the reference value P2. The 'controller' may be any arrangement of, at a temperature raising time that is a time when the accumulator unit is raised in temperature, controlling the internal combustion engine and the motor so that the accumulator unit is charged or discharged based on the set power demand while the vehicle is driven with a power corresponding to the set power demand, for example, an arrangement of not performing charge or discharge according to the state of charge (SOC) of the battery 50 but setting the charge-discharge power demand Pb* only based on the vehicle power demand P*, or another arrangement of setting the charge-discharge power demand Pb* to the charging power Pcha when the vehicle power demand P* is less than the reference value Pref and setting the charge-discharge power demand Pb* to the discharging power Pdis when the vehicle power demand P* is more than or equal to the reference value Pref. The 'remaining capacity measurement unit' is not restricted to the arrangement of calculating the state of charge (SOC) of the battery 50 from an integrated value of the charge-discharge current measured by the current sensor but may be any arrangement of measuring a remaining capacity that indicates an amount dischargeable from the accumulator unit. The 'electric power-mechanical power input output assembly' is not restricted to the combination of the power distribution integration mechanism 30 with the motor MG1 or to the pair-rotor motor 230 but may be any assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power, and constructed to transmit electric power to and from the accumulator unit. The 'generator' is not restricted to the motor MG1 constructed as a synchronous motor generator but may be any type of generator connected with the accumulator unit and constructed to input and output power, for example, an induction motor. The 'three shaft-type power input output structure' is not restricted to the power distribution integration mechanism 30 but may be any structure connected to three shafts, the driveshaft, the output shaft of the internal combustion engine, and a rotating shaft of the generator, and designed to input and output power to residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism. The 'power generation unit' is not restricted to the combination of the engine 22 with the motor MG1 of the hybrid vehicle 320 or to the fuel cells 430 in the modified examples but may be any arrangement designed to receive a supply of fuel and generate electric power. The 'controller' in the second vehicle of the invention is not restricted to an arrangement in which the control relating to the engine 22 and the motor MG1 in the control performed by the 'controller' in the first vehicle of the invention described above is replaced with control relating to a power generation unit. The 'controller' in the second vehicle of the invention is not restricted thus to the arrangement of controlling the power generation unit and a motor so that the vehicle is driven with the vehicle power demand P* while operating the power generation unit according to a calculated power as the sum of the vehicle power demand P* and the charge-discharge power demand Pb*, the arrangement wherein the charge-discharge power demand Pb* is set to the charging power Pcha regardless of the vehicle power demand P* when the state of charge (SOC) of the battery 50 is less than the reference value S1, the charge-discharge power demand Pb* is set to the discharging power Pdis regardless of the vehicle power demand P* when the state of charge (SOC) of the battery 50 is more than or equal to the reference value S2, and the charge-discharge power demand Pb* is set, when the state of charge (SOC) of the battery 50 is more than or equal to the reference value S1 and less than the reference value S2, to the charging power Pcha when the vehicle power demand P* is less than the reference value P1, to the discharging power Pdis when the vehicle power demand P* is more than or equal to the reference value P2, and to the last set charge-discharge power demand Pb* without change in value when the vehicle power demand P* is more than or equal to the reference value P1 and less than the reference value P2. The 'controller' may be any arrangement of, at a temperature raising time that is a time when the accumulator unit is raised in temperature, control the power generation unit and the motor so that the accumulator unit is charged or discharged based on the set power demand while the vehicle is driven with a power corresponding to the set power demand.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many other modifications, changes, and alterations without departing from the scope or spirit of the main characteristics of the present invention.

INDUSTRIAL APPLICABILITY

The technique of the invention is preferably applied to the manufacturing industries of the vehicles.

The invention claimed is:

1. A vehicle, comprising:
   an internal combustion engine capable of outputting power for driving the vehicle;
   a motor constructed to input and output power for driving the vehicle;
   an accumulator unit designed to transmit electric power to and from the motor;
   a power demand setting module configured to set a power demand required for driving the vehicle; and
   a controller programmed to, in a repeatedly run control routine, at a temperature raising time that is a time when the accumulator unit is raised in temperature and a state of charge of the accumulator unit is within a predetermined range, control the internal combustion engine, charging or discharging of the accumulator unit, and the motor so that:
   (i) if the set power demand is more than or equal to a first power, then the accumulator unit is discharged;
   (ii) if the set power demand is less than a second power which is smaller than the first power, then the accumulator unit is charged;
   (iii) if the set power demand is less than the first power and more than or equal to the second power, then the accumulator unit keeps being charged or discharged based on the power demand set in the last execution of the control routine.

2. The vehicle in accordance with claim 1, the vehicle further having:
   a remaining capacity measurement unit configured to measure a remaining capacity that indicates an amount dischargeable from the accumulator unit,
   wherein the controller, at the temperature raising time, controls the internal combustion engine and the motor so that the accumulator unit is charged or discharged based on the measured remaining capacity.

3. The vehicle in accordance with claim 2, wherein the controller, at the temperature raising time, is programmed to control the internal combustion engine and the motor so that:
   if the measured remaining capacity is more than or equal to a first amount, the accumulator unit is discharged regardless of the set power demand, and
   if the measured remaining capacity is less than a second amount which is smaller than the first amount, the accumulator unit is charged regardless of the set power demand.

4. The vehicle in accordance with claim 1, wherein the controller, at the temperature raising time, controls the internal combustion engine and the motor so that the accumulator unit is charged by a predetermined charging power to charge the accumulator unit, and controls the internal combustion engine and the motor so that the accumulator unit is discharged by a predetermined discharging power to discharge the accumulator unit.

5. The vehicle in accordance with claim 1, the vehicle further having:
   an electric power-mechanical power input output assembly connected with a driveshaft linked to an axle of the vehicle and with an output shaft of the internal combustion engine in such a manner as to be rotatable independently of the driveshaft and configured to input and output power to and from the driveshaft and the output shaft through input and output of electric power and mechanical power, and constructed to transmit electric power to and from the accumulator unit,
   wherein the motor is so connected with the driveshaft as to input and output power to and from the driveshaft.

6. The vehicle in accordance with claim 5, wherein the electric power-mechanical power input and output assembly has:
- a generator connected with the accumulator unit and constructed to input and output power; and
- a three shaft-type power input output structure connected to three shafts, the driveshaft, the output shaft of the internal combustion engine, and a rotating shaft of the generator, and designed to input and output power to residual shaft based on powers input from and output to any two shafts among the three shafts.

7. The vehicle in accordance with claim 1, wherein the controller, at the temperature raising time, controls the internal combustion engine and the motor so that a charging power into the accumulator unit or a discharging power from the accumulator unit is maintained to keep charging or discharging the accumulator unit.

8. A vehicle, comprising:
- a power generation unit designed to receive a supply of fuel and generate electric power;
- a motor constructed to input and output power for driving the vehicle;
- an accumulator unit designed to transmit electric power to and from the motor;
- a power demand setting module configured to set a power demand required for driving the vehicle; and
- a controller programmed to, in a repeatedly run control routine, at a temperature raising time that is a time when the accumulator unit is raised in temperature and a state of charge of the accumulator unit is within a predetermined range, control the internal combustion engine, charging or discharging of the accumulator unit, and the motor so that;
  (i) if the set power demand is more than or equal to a first power, then the accumulator unit is discharged;
  (ii) if the set power demand is less than a second power which is smaller than the first power, then the accumulator unit is charged;
  (iii) if the set power demand is less than the first power and more than or equal to the second power, then the accumulator unit keeps being charged or discharged based on the power demand set in the last execution of the control routine.

9. The vehicle in accordance with claim 8, the vehicle further having:
- a remaining capacity measurement unit configured to measure a remaining capacity that indicates an amount dischargeable from the accumulator unit,
- wherein the controller, at the temperature raising time, is programmed to control the power generation unit and the motor so that;
  if the measured remaining capacity is more than or equal to a first amount, the accumulator unit is discharged regardless of the set power demand, and
  if the measured remaining capacity is less than a second amount which is smaller than the first amount, the accumulator unit is charged regardless of the set power demand.

10. The vehicle in accordance with claim 8, wherein the power generation unit has:
- an internal combustion engine; and
- a generator designed to receive output power of the internal combustion engine and generate electric power.

11. The vehicle in accordance with claim 8, wherein the power generation unit has fuel cells.

12. A control method of a vehicle, the vehicle having: an internal combustion engine capable of outputting power for driving the vehicle; a motor constructed to input and output power for driving the vehicle; and an accumulator unit designed to transmit electric power to and from the motor,
- the control method for repeatedly running a control routine, at a temperature raising time that is a time when the accumulator unit is raised in temperature and a state of charge of the accumulator unit is within a predetermined range, controlling the internal combustion engine, charging or discharging of the accumulator unit, and the motor so that:
  (i) if the required power demand for driving the vehicle is more than or equal to a first power, then the accumulator unit is discharged;
  (ii) if the required power demand for driving the vehicle is less than a second power which is smaller than the first power, then the accumulator unit is charged;
  (iii) if the required power demand for driving the vehicle is less than the first power and more than or equal to the second power, then the accumulator unit keeps being charged or discharged based on the power demand set in the last execution of the control routine.

13. The control method of the vehicle in accordance with claim 12, the control method, at the temperature raising time, controlling the internal combustion engine and the motor so that:
  if a remaining capacity that indicates an amount dischargeable from the accumulator unit is more than or equal to a first amount, the accumulator unit is discharged regardless of the required power demand, and
  if the remaining capacity is less than a second amount which is smaller than the first amount, the accumulator unit is charged regardless of the required power demand.

14. A control method of a vehicle, the vehicle having: a power generation unit designed to receive a supply of fuel and generate electric power; a motor constructed to input and output power for driving the vehicle; and an accumulator unit designed to transmit electric power to and from the motor,
- the control method for repeatedly running a control routine, at a temperature raising time that is a time when the accumulator unit is raised in temperature and a state of charge of the accumulator unit is within a predetermined range, controlling the internal combustion engine, charging or discharging of the accumulator unit, and the motor so that:
  (i) if the required power demand for driving the vehicle is more than or equal to a first power, then the accumulator unit is discharged;
  (ii) if the required power demand for driving the vehicle is less than a second power which is smaller than the first power, then the accumulator unit is charged;
  (iii) if the required power demand for driving the vehicle is less than the first power and more than or equal to the second power, then the accumulator unit keeps being charged or discharged based on the power demand set in the last execution of the control routine.

15. The control method of the vehicle in accordance with claim 14, the control method, at the temperature raising time, controlling the power generation unit and the motor so that:
  if a remaining capacity that indicates an amount dischargeable from the accumulator unit is more than or equal to a first amount, the accumulator unit is discharged regardless of the required power demand, and
  if the remaining capacity is less than a second amount which is smaller than the first amount, the accumulator unit is charged regardless of the required power demand.

* * * * *

UNITED STATES PATENT AND TRADEMARK OFFICE
CERTIFICATE OF CORRECTION

PATENT NO. : 8,424,624 B2  Page 1 of 1
APPLICATION NO. : 12/527972
DATED : April 23, 2013
INVENTOR(S) : Oyama et al.

It is certified that error appears in the above-identified patent and that said Letters Patent is hereby corrected as shown below:

In the Specification:

In the section entitled BEST MODES OF CARRYING OUT THE INVENTION, at column 11, line 62, equation 7:
Delete "$Tm2min=(Win-Tm1*Nm1)/Nm2$" and insert therefor --$Tm2min=(Win-Tm1*\cdot Nm1)/Nm2$--;

at column 11, line 64, equation 8:
Delete "$Tm2min=(Wout-Tm1*Nm1)/Nm2$" and insert therefor
--$Tm2min=(Wout-Tm1*\cdot Nm1)/Nm2$--;

at column 16, line 20:
Delete "value 51" and insert therefor --value S1--;

In the Claims, at column 19, claim 8, line 33:
Delete "motor so that;" and insert therefor --motor so that:--;

at column 19, claim 9, line 51:
Delete "motor so that;" and insert therefor --motor so that:--.

Signed and Sealed this
Thirteenth Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,424,624 B2  Page 1 of 1
APPLICATION NO. : 12/527972
DATED : April 23, 2013
INVENTOR(S) : Oyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 606 days.

Signed and Sealed this
Eighth Day of September, 2015

Michelle K. Lee
*Director of the United States Patent and Trademark Office*